(12) United States Patent
Suzuki et al.

(10) Patent No.: US 6,474,456 B2
(45) Date of Patent: Nov. 5, 2002

(54) HYDRAULIC CONTROL APPARATUS FOR AUTOMATIC TRANSMISSIONS

(75) Inventors: Akitomo Suzuki, Anjo (JP); Takayuki Hisano, Anjo (JP); Masaaki Nishida, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 78 days.

(21) Appl. No.: 09/740,060

(22) Filed: Dec. 20, 2000

(65) Prior Publication Data

US 2001/0004621 A1 Jun. 21, 2001

(30) Foreign Application Priority Data

Dec. 20, 1999 (JP) .............................. 11-361810

(51) Int. Cl.⁷ .............................................. F16H 61/14
(52) U.S. Cl. ...................... 192/3.29; 137/269; 475/69
(58) Field of Search ............................. 475/59, 69, 70; 192/3.29; 74/606 R; 137/269, 884

(56) References Cited

U.S. PATENT DOCUMENTS

| 4,449,426 A | * | 5/1984 | Younger ................. 137/884 X |
| 5,486,146 A |   | 1/1996 | Asahara et al. |
| 5,503,601 A | * | 4/1996 | Bastio ........................ 475/116 |
| 5,536,221 A | * | 7/1996 | Lee ............................ 477/143 |
| 5,701,982 A | * | 12/1997 | Nakatani et al. ............. 192/3.3 |
| 5,802,490 A | * | 9/1998 | Droste ....................... 192/3.28 |

FOREIGN PATENT DOCUMENTS

| JP | A-7-71591 | 3/1995 |
| JP | B2-2641419 | 5/1997 |

\* cited by examiner

Primary Examiner—Ankur Parekh
(74) Attorney, Agent, or Firm—Oliff & Berridge, PLC

(57) ABSTRACT

A hydraulic control apparatus for automatic transmissions, capable of adapting the apparatus to a change in the specifications for a lockup clutch which causes the relationship between the supplying and discharging of a hydraulic pressure for a lockup control operation to be reversed with respect to the connection of oil passages. A valve body of the hydraulic control apparatus is formed by laminating at least two members on each other, and has a valve for regulating a hydraulic pressure supplied to a lockup clutch of a hydraulic transmission unit, a control unit for applying a signal pressure to the pressure regulating valve, a source pressure oil passage for supplying a basic pressure for a pressure regulating operation, and drain oil passage communicated with a drain port. The pressure regulating passage is provided at both sides of a port, which communicates with a lockup oil chamber via an oil passage, with a port communicating with an oil passage, and a port communicating with another oil passage. The openings of the oil passages provided in one member of the valve body are provided so as to overlap respectively both the openings of the source oil passage and drain oil passage provided in the other member thereof. The communication relationship between the two oil passages and the source pressure oil passage and drain oil passage is changed by the communication ports and closing portions of a separator plate inserted between the two members of the valve body.

10 Claims, 11 Drawing Sheets

HYDRAULIC CONTROL APPARATUS FOR AUTOMATIC TRANSMISSIONS

BACKGROUND OF THE INVENTION

1. Field of Invention

The invention relates to a hydraulic control apparatus for automatic transmissions provided with a lockup clutch-carrying hydraulic transmission unit, and more particularly to techniques for rendering a hydraulic control apparatus adaptable to variations in types of hydraulic transmission unit.

2. Description of Related Art

A torque converter or a fluid joint, as a hydraulic transmission unit provided on an automatic transmission, is usually provided with a lockup clutch for the purpose of reducing the transmission loss ascribed to a slip of a fluid.

The lockup clutches include a single plate-type lockup clutch (refer to, for example, Japanese Patent Laid-Open No. 71591/1995) having a comparatively small transfer torque but advantages residing in the light weight and compactness, and a multiplate-type lockup clutch (refer to, for example, Japanese Patent Registration No. 2641419) having large dimensions as compared with a single plate-type lockup clutch but a large transfer torque and excellent controllability.

The single plate-type lockup clutch employs the following structure. In such a lockup clutch, a clutch made integral with a clutch piston is operated in accordance with relative levels of hydraulic pressure in a converter chamber, as a hydraulic transmission chamber in a space between a transmission case and clutch plate, i.e. a differential pressure applied to the clutch plate. When a hydraulic pressure is supplied to the converter chamber, the clutch plate is press-engaged with the transmission case, and placed in a locked-up state (hereinafter referred to as "lockup on"). Conversely, when a hydraulic pressure is supplied from a space between the transmission case and clutch plate, a lockup disengaged state (hereinafter referred to as "lockup off") is attained. Therefore, a hydraulic lockup chamber is opened with respect to the converter chamber.

On the other hand, the multiplate lockup clutch employs a structure in which a clutch piston and its engageable element are formed separately with a transmission case constituted by a clutch cylinder. Therefore, a hydraulic lockup chamber is formed independently of a converter chamber. In contrast with the case of the single plate-type lockup clutch, a space between the transmission case and a clutch piston constitutes the hydraulic lockup chamber, into which a high hydraulic pressure is supplied from the converter chamber to attain a locked-up state.

Changing the general structure of an automatic transmission every time, in order to adapt the automatic transmission to minute specification differences concerning the kind of vehicle and engine torque characteristics, causes manufacturing costs to increase greatly and lacks rationality. In general, in an automatic transmission, the control of a hydraulic transmission unit, including the control of a speed change gear and a lockup control operation, is done by a common hydraulic control apparatus, which is formed of a hydraulic circuit in which a large number of valves and orifices incorporated in a valve body are connected together by entangled oil passages. Therefore, the speed change gear can be adapted to various kinds of specifications by merely replacing some parts thereof with others. However, in a case where a hydraulic transmission unit of a different type of lockup clutch is used, the supply of a hydraulic pressure and a lockup operation with respect thereto are reversed as mentioned above. Consequently, the changing of the hydraulic circuit in accordance with the changed specifications cannot be done by simple part-changing work including the replacement of valves, so that a valve body as a whole is necessarily changed. The changing of a valve body causes an increase in the metal mold design expense for the production of the valve body, and the cost of manufacturing the apparatus increases.

To be more exact, a pressure regulating valve inserted in the hydraulic circuit for carrying out a lockup control operation is operated by a signal pressure applied thereto. When the occurrence of a failure to apply a signal pressure to the valve is imagined, attaining lockup off at the time of occurrence of a failure to output a signal pressure is important for securing the travel of a vehicle. In view of the matter, it is desirable irrespective of the type of lockup clutch in use that the applying of a signal pressure to the pressure regulating valve starts its pressure regulating operation. Due to the relationship between such an operation of the pressure regulating valve and the connection of oil passages to a hydraulic lockup chamber, it is impossible to adapt the hydraulic circuit to changed specifications by replacing a pressure regulating valve.

SUMMARY OF THE INVENTION

The invention has been made in view of the above circumstances, and provides a hydraulic control apparatus for automatic transmissions, capable of being adapted to a change in the specifications of a lockup clutch, in which the relationship between the supplying and discharging of a hydraulic pressure for a lockup operation is reversed with respect to the connection of the oil passages, without requiring substantial changes in a valve body, and, moreover, without changing the operation of a pressure regulating valve with respect to the application of a signal pressure.

According to one aspect of the invention, the hydraulic control apparatus for automatic transmissions provided with a hydraulic transmission unit in which a hydraulic lockup chamber of a lockup clutch is independent of a hydraulic transmission chamber, has a valve body which is formed by laminating at least two members and which has a pressure regulating valve adapted to regulate a hydraulic pressure supplied to the lockup clutch, a control unit adapted to apply a signal pressure to the pressure regulating valve, a source pressure oil passage adapted to supply a basic pressure for the above-mentioned hydraulic pressure regulating operation, and drain oil passages communicating with a drain port, the pressure regulating valve having a second port to which a signal pressure from the control unit is applied, a fourth port communicated with the hydraulic lockup chamber, a third port provided on one side of the fourth port, and a fifth port provided on the other side of the fourth port, an opening of an oil passage communicated with the third port and provided in one member of the valve body being formed so as to overlap both an opening of the source pressure oil passage and that of the drain oil passage which are provided in the other member of the valve body, an opening of an oil passage communicated with a fifth port and provided in the first-mentioned member of the valve body being formed so as to overlap both an opening of the source pressure oil passage and that of the drain oil passage which are provided in the second-mentioned member of the valve body, a separator plate provided with communication ports for communicating an opening of an oil passage, which is communicated with the third port, and that of the source pressure oil passage with each other, and an opening of an oil passage, which is communicated with the fifth port, and that of the drain oil passage with each other, being inserted between the two members of the valve body.

According to another aspect of the invention, the hydraulic control apparatus for automatic transmissions provided with a hydraulic transmission unit in which a hydraulic lockup chamber of a lockup clutch is opened in a hydraulic transmission chamber has a valve body which is formed by laminating at least two members on each other, and which has a pressure regulating valve adapted to regulate a hydraulic pressure supplied to the lockup clutch, a control unit adapted to apply a signal pressure to the pressure regulating valve, a source pressure oil passage adapted to supply a basic pressure for the above-mentioned hydraulic pressure regulating operation, and drain oil passages communicating with a drain port, the pressure regulating valve having a second port to which a signal pressure from the control unit is applied, a fourth port communicated with the hydraulic lockup chamber, a third port provided on one side of the fourth port, and a fifth port provided on the other side of the fourth port, an opening of an oil passage communicated with the third port and provided in one member of the valve body being formed so as to overlap both an opening of the source pressure oil passage and that of the drain oil passage which are provided in the other member of the valve body, an opening of an oil passage communicated with a fifth port and provided in the first-mentioned member of the valve body being formed so as to overlap both an opening of the source pressure oil passage and that of the drain oil passage which are provided in the second-mentioned member of the valve body, a separator plate provided with communication ports which communicate an opening of the oil passage, which is communicated with the third port, and that of the drain oil passage with each other, and an opening of an oil passage, which is communicated with the fifth port, and that of the source pressure oil passage with each other, respectively, being inserted between the two members of the valve body.

According to still another aspect of the invention, the hydraulic control apparatus for automatic transmissions provided with the hydraulic transmission unit in which the hydraulic lockup chamber of the lockup clutch is independent of the hydraulic transmission chamber has the pressure regulating valve further having first and sixth ports, the first port being provided on the opposite side of the sixth port to which side the regulating valve is moved when a signal pressure is applied from the control unit, an opening of a transmission chamber oil passage communicated with the hydraulic transmission chamber and that of a hydraulic lockup passage communicated with the hydraulic lockup chamber being provided in the second-mentioned member of the valve body, an opening of an oil passage communicated with the first port and that of an oil passage communicated with the sixth port being provided so as to overlap both an opening of a hydraulic transmission passage and that of a hydraulic lockup passage respectively, the separator plate having communication ports which communicate the oil passage, which is communicates with the first port, and the hydraulic transmission passage with each other, and the oil passage, which communicates with the sixth port, and the hydraulic lockup passage with each other respectively, whereby an effective structure is obtained.

According to a further aspect of the invention, the hydraulic control apparatus for automatic transmissions provided with the hydraulic transmission unit in which the hydraulic lockup chamber of the lockup clutch is opened in the hydraulic transmission chamber has the pressure regulating valve further having first and sixth ports, the first port being provided on the opposite side of the sixth port to which side the regulating valve is moved when a signal pressure is applied from the control unit, the hydraulic transmission passage communicated with the hydraulic transmission chamber and the opening of the hydraulic lockup passage communicated with the hydraulic lockup chamber being provided in the second-mentioned member of the valve body, an opening of an oil passage communicated with the first port and provided in the first-mentioned member of the valve body being provided so as to overlap both an opening of the hydraulic transmission passage provided in the second-mentioned member of the valve body and that of the hydraulic lockup passage, an opening of an oil passage communicated with the sixth port and provided in the first-mentioned member of the valve body being provided so as to overlap both an opening of the hydraulic transmission passage provided in the second-mentioned valve body and that of the hydraulic lockup passage, the separator plate having communication ports which communicate the oil passage, which communicates with the first port, and the hydraulic transmission passage with each other, and the oil passage, which communicates with the sixth port, and the hydraulic lockup passage with each other respectively, whereby an effective structure is obtained.

According to another aspect of the invention, the hydraulic control apparatus for automatic transmissions includes a relay valve having a port to which a signal pressure from the control unit is applied and a port in communication with the hydraulic transmission chamber, the relay valve adapted to control a hydraulic pressure in the hydraulic transmission chamber in accordance with the signal pressure from the control unit, whereby an effective structure is obtained.

According to still another aspect of the invention, the hydraulic control apparatus for automatic transmissions has the relay valve formed separately from the pressure regulating valve, whereby an effective structure is obtained.

According to a further aspect of the invention, the hydraulic control apparatus for automatic transmissions has the relay valve made integral with the pressure regulating valve, whereby an effective structure is also obtained.

In the first structure, the opening of the oil passage in communication with the third port of the pressure regulating valve and that of the oil passage in communication with the fifth port thereof which are provided in one member of the valve body are provided so as to overlap both the opening of the source pressure oil passage and that of the drain oil passage which are provided in the other member of the valve body respectively. Therefore, when a hydraulic transmission unit in which the hydraulic lockup chamber is independent of the hydraulic transmission chamber is changed to a hydraulic transmission unit in which the hydraulic lockup chamber is opened in the hydraulic transmission chamber, it is possible, by merely replacing a separator plate inserted between the two members of the valve body, to reverse the relationship between the supplying and discharging of a hydraulic pressure done by an operation of the pressure regulating valve, and thereby adapt the apparatus to a change in the type of a lockup clutch of the hydraulic transmission unit. Consequently, according to this structure, only the replacement of a separator plate, which serves the purpose by merely making a change of the position of the communication port thereof, removes the need to replace the valve body, which demands a change of the design of a metal mold therefor, when the arrangement of the oil passages is changed.

In the second structure, the opening of the oil passage in communication with the third port of the pressure regulating valve and that of the oil passage in communication with the fifth port thereof which are provided in one member of the valve body are provided so as to overlap both the opening of the source pressure oil passage and that of the drain oil passage which are provided in the other member of the valve body respectively. Therefore, when a hydraulic transmission unit, in which the hydraulic lockup chamber is opened in the hydraulic transmission chamber, is changed to a hydraulic transmission unit in which the hydraulic lockup chamber is provided independently, it is possible, by merely replacing a separator plate, to reverse the relationship between the supplying and discharging of a hydraulic pressure done by an operation of the pressure regulating valve, and thereby adapt the apparatus to a change in the type of lockup clutch of the hydraulic transmission unit. Consequently, according to this structure, only the replacement of a separator plate, which serves the purpose by merely making a change in the position of the communication port thereof, eliminates the need for the valve body, which demands a change of the design of a metal mold therefor when the arrangement of oil passages is changed.

According to the third structure, the opening of the oil passage communicated with the first port and that of the oil passage communicated with the sixth port are provided so as to overlap both the opening of the hydraulic transmission passage and that of the hydraulic lockup passage respectively. Therefore, even when a hydraulic transmission unit in which the hydraulic lockup chamber is provided independently is changed to a hydraulic transmission unit in which the hydraulic lockup chamber is provided non-independently, it is possible, by merely replacing a separator plate, to control a differential pressure of the hydraulic transmission unit set in accordance with an operation of the lockup clutch with respect to that of the pressure regulating valve.

According to the fourth structure, the opening of the oil passage in communication with the first port and that of the oil passage in communication with the sixth port are provided so as to overlap both of the opening of the hydraulic transmission passage and that of the hydraulic lockup passage respectively. Therefore, when a hydraulic transmission unit, in which the hydraulic lockup chamber is provided non-independently, is changed to a hydraulic lockup chamber in which the hydraulic lockup chamber is provided independently, it is possible, by merely replacing a separator plate, to control a differential pressure of the hydraulic transmission unit set in accordance with the operation of the lockup clutch with respect to that of the pressure regulating valve.

According to the fifth structure, the hydraulic pressure of the hydraulic transmission chamber can be controlled by the relay valve, so that a coupling force of the lockup clutch can be increased.

According to the sixth structure, the hydraulic pressure of the hydraulic transmission chamber can be controlled irrespective of the movement of the pressure regulating valve by forming the relay valve separately from the pressure regulating valve.

According to the seventh structure, the valve body can be made compact by forming the relay valve and pressure regulating valve integrally.

BRIEF DESCRIPTION OF THE DRAWINGS

Preferred embodiments of the invention will be described in detail on the basis of the following figures, wherein.

DETAILED DESCRIPTION OF PREFERRED EMBODIMENTS

Figure 1:
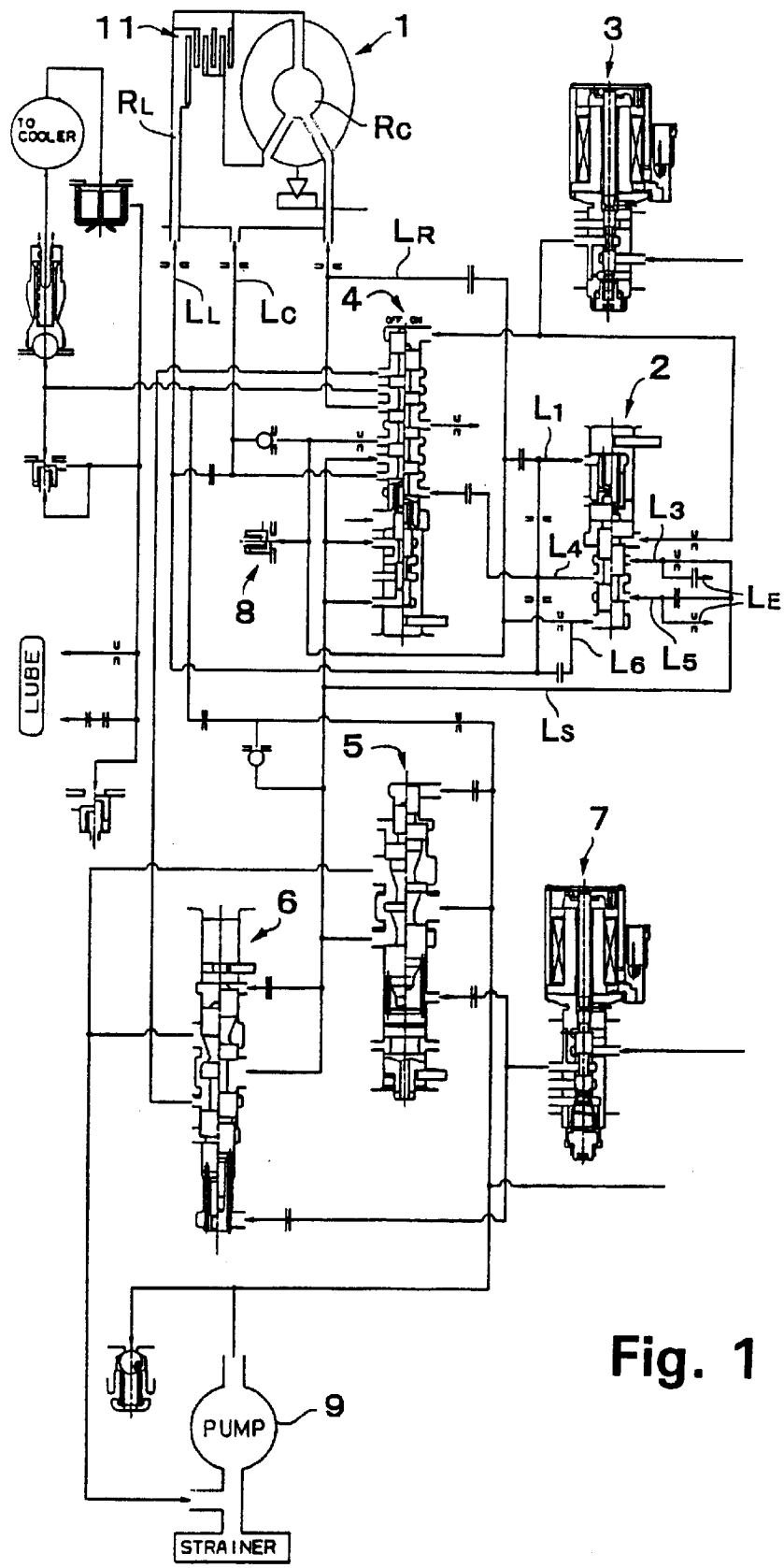
FIG. 1 is a circuit diagram of a first mode of an embodiment of the hydraulic control apparatus for automatic transmissions according to the invention.

The modes of an embodiment of the invention will now be described with reference to the drawings. FIGS. 1–9 show a first mode of an embodiment of an automatic transmission provided with a hydraulic control apparatus to which the concept of the invention is applied. A rough structure of this mode of the embodiment will first be described. As shown in FIG. 1, illustrating the structure of a hydraulic circuit, a hydraulic transmission unit 1 is formed as a torque converter in which a hydraulic lockup chamber $R_L$ of a lockup clutch 11 is independent of a converter chamber $R_C$ as a hydraulic transmission chamber. As shown in schematic section in FIGS. 2(A) and 2(B), a valve body of the hydraulic control apparatus is formed of two members $B_1$, $B_2$ laminated on each other, and has a lockup control valve 2 as a pressure regulating valve adapted to regulate a hydraulic pressure supplied to the lockup clutch 11, a lockup linear solenoid valve 3 as a control unit for applying a signal pressure to the lockup control valve 2, a source pressure oil passage (hereinafter referred to as a secondary pressure oil passage in the description of the mode of embodiment) $L_S$, adapted to supply a secondary pressure (a hydraulic pressure obtained by further regulating an excess pressure, which is discharged when a discharge pressure from an oil pump 9 is regulated to a line pressure by a primary regulator valve 5 by the application of a signal pressure of a throttle linear solenoid valve 7 corresponding to a vehicle load, to a level suitable for the transmission of fluid power by a secondary regulator valve 6 as a basic pressure for a pressure regulating operation carried out by the lockup control valve 2, and a drain oil passage $L_E$ communicated with a drain port.

Figure 5:
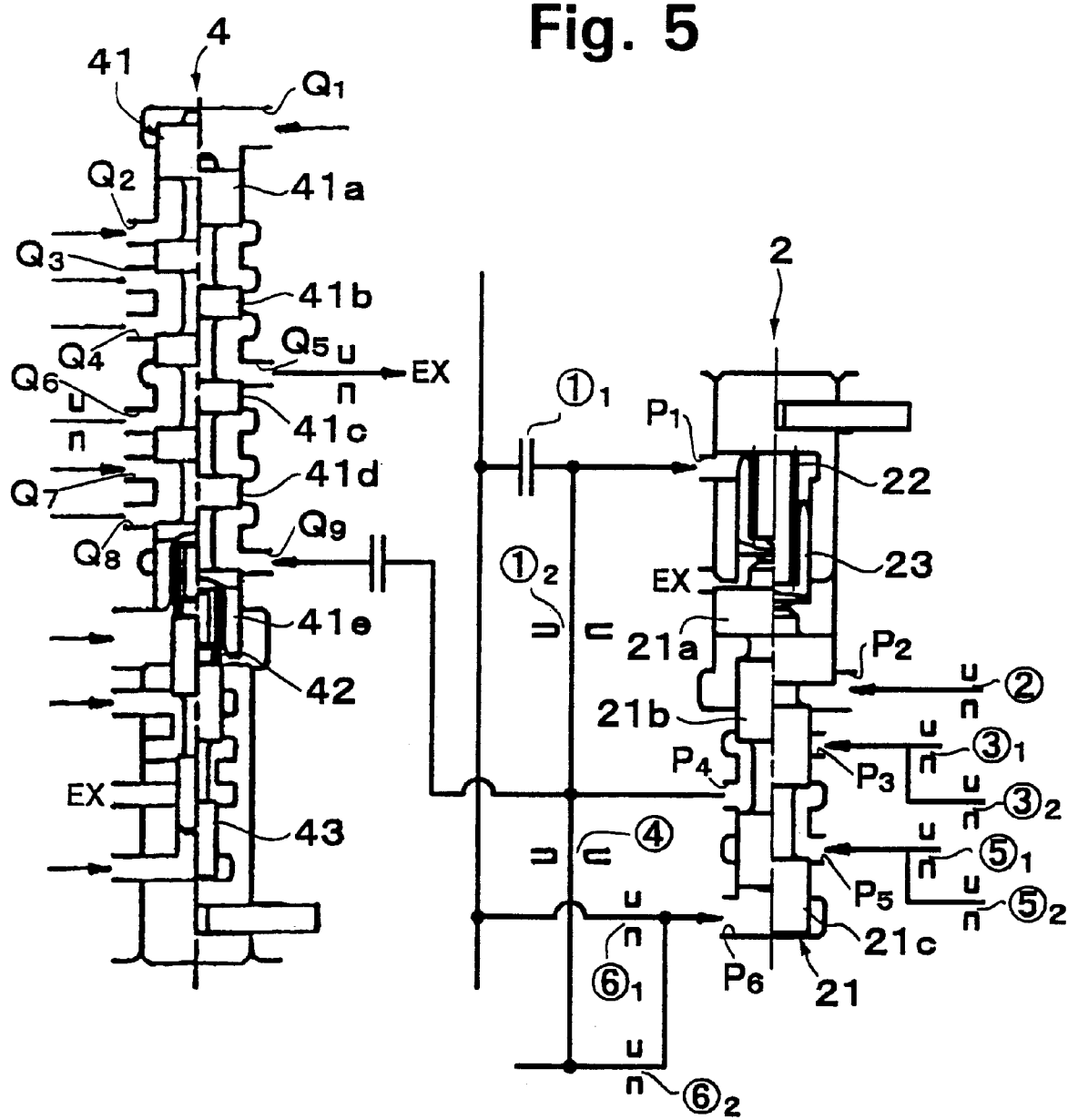
FIG. 5 is a partial circuit diagram showing the details of a pressure regulating valve and a lockup relay valve in the first mode of the embodiment of the hydraulic control apparatus.

As shown in detail in an enlarged scale in FIG. 5, the lockup control valve 2 has a second port $P_2$ to which a signal pressure from the linear solenoid valve 3 is applied, a fourth port $P_4$ in communication with the hydraulic lockup chamber $R_L$, a third port $P_3$ on one side of the fourth port $P_4$, and a fifth port $P_5$ on the other side of the fourth port $P_4$. The lockup control valve 2 is further provided with first and sixth ports $P_1$, $P_6$ on the outer side of the second to fifth ports. The first port $P_1$ is provided on the opposite end to the sixth port $P_6$, to which side the lockup control valve 2 is moved when a signal pressure is applied from the linear solenoid valve 3 to the port $P_1$.

Figure 2A:
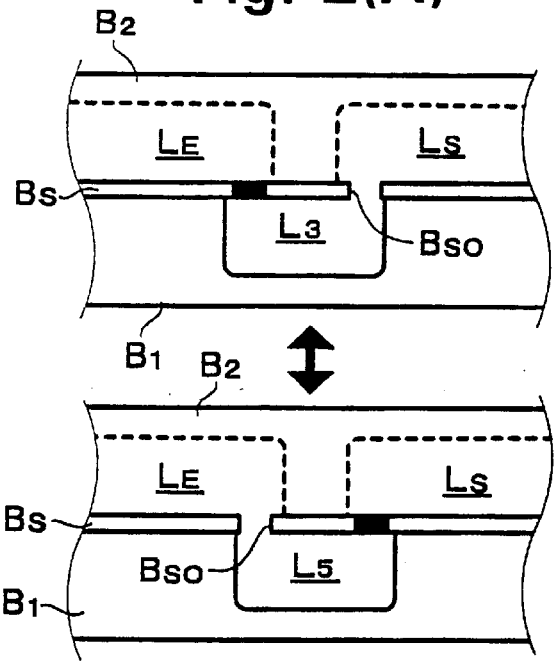
FIGS. 2(A) and 2(B) are a sectional views showing the structure of openings of oil passages in a valve body in the first mode of embodiment.
Figure 2B:
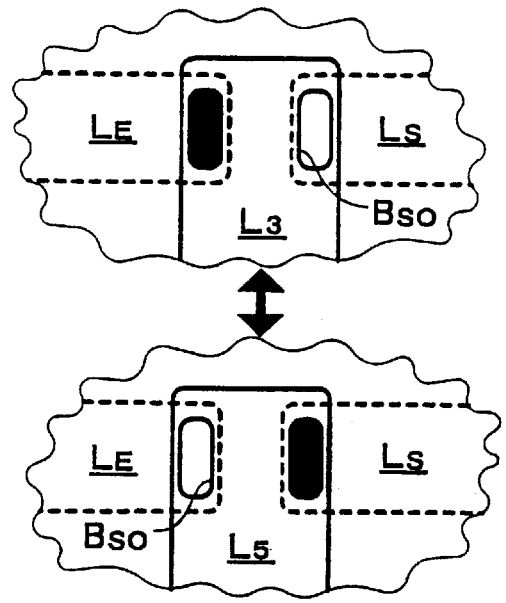
Figure 3A:
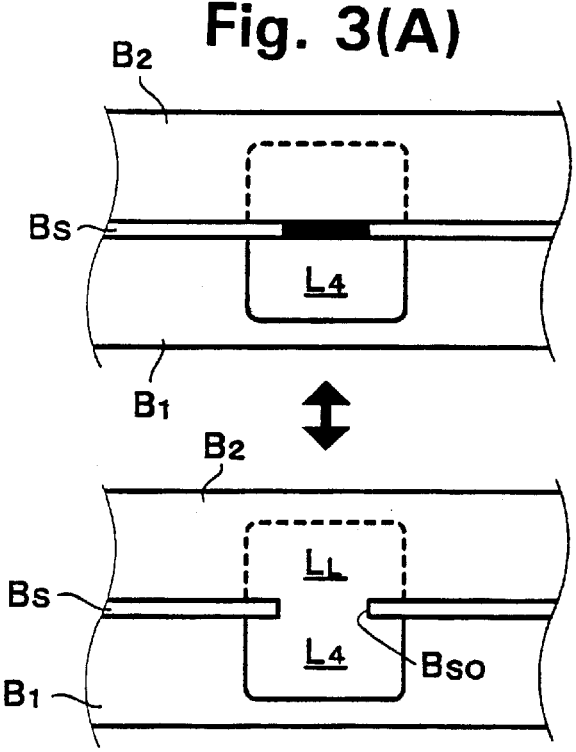
FIGS. 3(A) and 3(B) are schematic sectional views showing the structure of openings of other oil passages in the valve body in the first mode of embodiment.
Figure 3B:
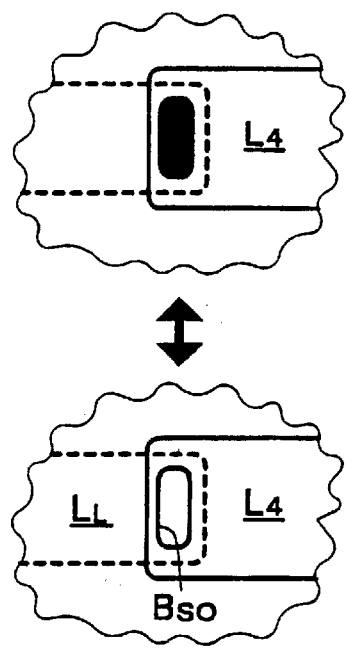

An opening of an oil passage $L_3$ communicates with the third port $P_3$ and is provided in one member $B_1$ of the valve body so as to overlap both an opening of the secondary pressure oil passage $L_S$ and that of a drain oil passage $L_E$ which are formed in the other member $B_2$ of the valve body, as shown in FIG. 2(A) illustrating schematic side elevational shapes of the openings and FIG. 2(B) illustrating schematic shapes thereof in plan. Similarly, an opening of an oil passage $L_5$ communicates with the fifth port $P_5$ and is provided in the first-mentioned member $B_1$ of the valve body so as to overlap both an opening of the secondary pressure oil passage $L_S$ and that of the drain oil passage $L_E$ which, as previously noted, are provided in the second-mentioned member $B_2$ of the valve body. A separator plate $B_S$, provided with a communication port $B_{SO}$ for changing the communication relationship between the above-mentioned openings in accordance with the type of a torque converter, is inserted between the two members $B_1$, $B_2$.

Although the operation for changing a communication relationship between the openings will be described later, the separator plate $B_S$, in the case of the circuit structure shown in FIG. 1, is provided in positions $(3)_1$, $(5)_1$ in FIG. 5 with communication ports $B_{SO}$ which communicate with the opening of the oil passage $L_3$, which communicates with the third port $P_3$, and the opening of the secondary pressure oil passage $L_S$, with each other, and the opening of the oil passage $L_5$, which is in communication with the fifth port $P_5$, and the opening of the drain oil passage $L_E$ with each other.

A hydraulic transmission passage $L_C$ communicates with the converter chamber $R_C$, and a hydraulic lockup passage $L_L$ communicates with the hydraulic lockup passage $R_L$ are provided in the second-mentioned member $B_2$ of the valve body. This case also has the same type structure (not shown) as that shown in FIGS. 2(A) and 2(B), in which an opening of an oil passage $L_1$, which communicates with the first port $P_1$, is provided in the first-mentioned member $B_1$ of the valve body and formed so as to overlap both an opening in the hydraulic transmission passage $L_C$, provided in the second-mentioned member of the valve body, and that of the hydraulic lockup passage $L_L$. An opening of an oil passage $L_6$, which communicates with the sixth port $P_6$, is also provided in the first-mentioned member $B_1$ and formed to overlap both the opening of the hydraulic transmission passage $L_C$, provided in the second-mentioned member $B_2$ of the valve body, and that of the hydraulic lockup passage $L_L$. A separator plate $B_S$ has communication ports which allow the oil passage $L_1$, which is in communication with the first port $P_1$, and the hydraulic lockup passage $L_L$ to communicate with each other, and an oil passage $L_6$, which is in communication with the sixth port $P_6$, and hydraulic transmission passage $L_C$ to communicate with each other.

Figure 4:
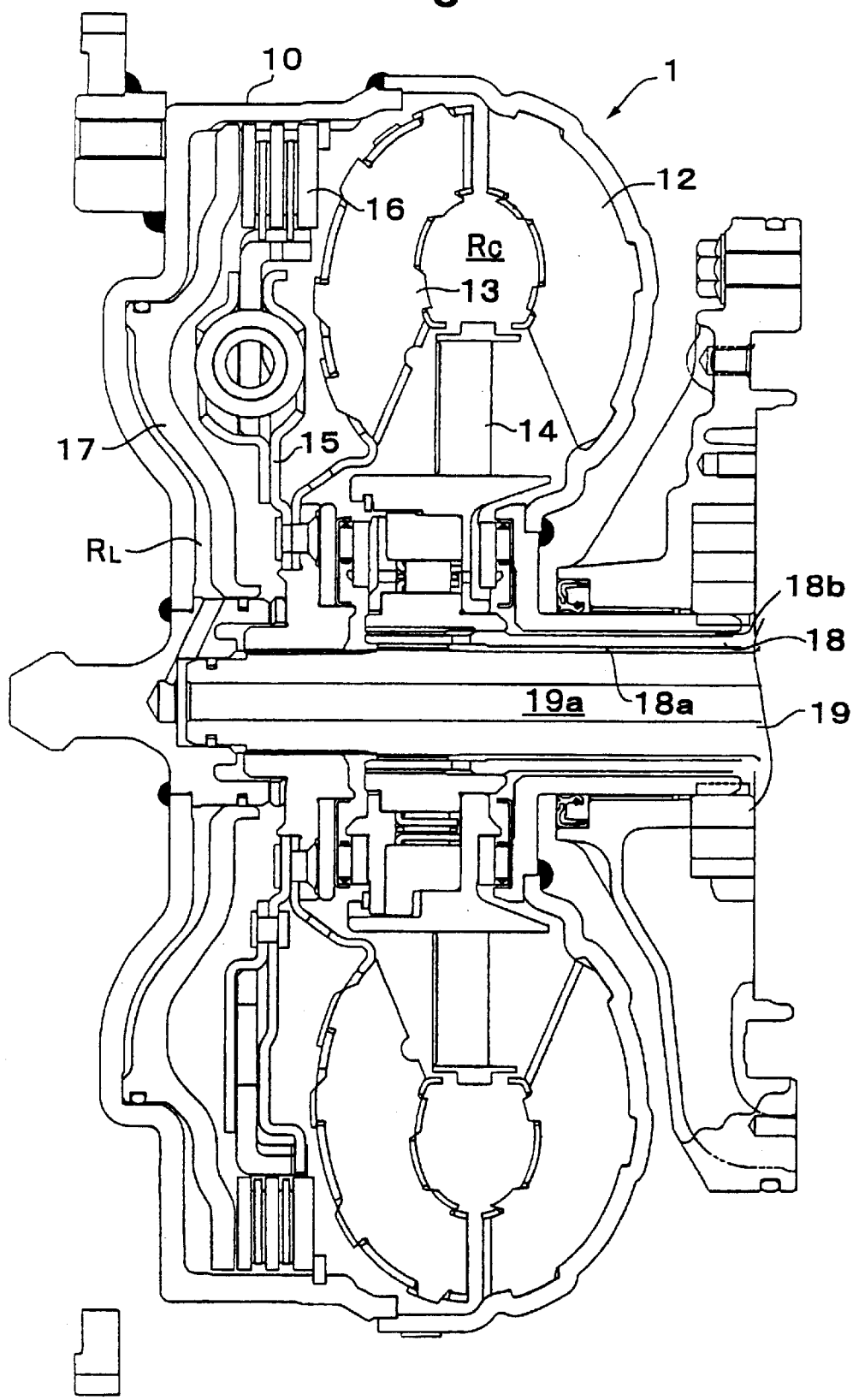
FIG. 4 is a sectional view showing the structure of a torque converter of the type in which a hydraulic lockup chamber is independently formed.

Each part will be described in detail. As shown in FIG. 4, the converter 1 is connected to a drive plate on an end portion of a crankshaft of an engine (not shown) and provided with a converter case 10 to which a pump impeller 12 is fixed. A turbine runner 13 opposes the pump impeller 12 and is non-rotatably supported on an input shaft 19 of a transmission by spline engagement. A stator 14 is interposed between these parts and supported unidirectionally and non-rotatably on a transmission case via a one-way clutch and a stator shaft 18, and a damper plate 15 is fixed to the hub of the turbine runner 13. A friction engaging element 16, including friction members and separator plates, is supported by outer and inner circumferences that are spline-connected to the converter case 10 and damper plate 15, respectively. A piston 17, with which the friction engaging element 16 is engaged, is formed so that the piston 17 is supported at its inner circumference by the outer circumference of a cylindrical boss (not numbered) of a center piece of the converter case 10 in a unitary state and at its outer circumference by the converter case 10. The inner circumference of the center piece supports a front end portion of the input shaft 19. In the vicinity of a circumferential surface of a front recessed portion of the converter case 10, a pressing portion extends outward from the piston 17 press-engaging the friction engaging element 16 with the piston 17. Thus, the hydraulic lockup chamber $R_L$ is independent of the hydraulic converter chamber $R_C$ which is provided therein with the pump impeller 12, turbine runner 13, stator 14 and damper plate 15 and is formed between the converter case 10 and the piston 17.

The hydraulic lockup chamber $R_L$ communicates with an oil passage 19a, inside the input shaft 19, via an oil passage in the centerpiece having the cylindrical boss, and further with the fourth port $P_4$ of the lockup control valve 2 via the oil passages $L_L$, $L_4$ in the second-mentioned member $B_2$ of the valve body. The hydraulic converter chamber $R_C$ communicates with the valve body via two oil passages. One of the two oil passages is formed of a clearance between an outer circumference of the input shaft 19 and an inner circumference of the stator shaft 18, and communicates with a port of a lockup relay valve 4 via an oil passage continuing from the clearance and formed of the hydraulic transmission passage $L_C$ in the second-mentioned member $B_2$ of the valve body. The other of the oil passages communicates with the port of the lockup relay valve 4, which is other than the port suggested above, via an oil passage 18b between the outer circumference of the stator shaft 18 and the converter case 10, and the oil passage $L_R$ continuing from the oil passage 18b and formed in the valve body.

As shown in detail on an enlarged scale in FIG. 5, the lockup control valve 2 is provided with a spool 21 having a large-diameter land 21a at one end of a pair of lands 21b, 21c, lands 21b, 21c having the same diameter, and a plunger 23 urging the spool 21 from an end of the large-diameter land 21a by the load of a spring 22. The second port $P_2$ is opened in a differential pressure receiving portion formed between the large-diameter land 21a and the land 21b adjacent thereto, and the third port $P_3$, which is adjacent to the second port, is opened and closed by the land 21b adjacent to the large-diameter land 21a. The fourth port $P_4$ is opened at all times between the two lands 21b, 21c, and the fifth port $P_5$ is opened and closed by the land 21c. The first port $P_1$ is opened toward a rear surface of the plunger 23, and the sixth port $P_6$ toward an end surface of the land 21c. A valve port space at contact portions of the spool 21 and plunger 23 constantly communicates with a drain so as to prevent the confinement of an oil pressure.

When a signal pressure is not applied to the second port $P_2$ in the lockup control valve 2 having such a structure, the spool 21 takes the right side position, shown in FIG. 5, to carry out the operation of communicating the fourth port $P_4$ with the fifth port $P_5$, and closing the third port $P_3$. When the supply of the signal pressure to the second port $P_2$ starts, the spool 21 starts moving from the right side position of FIG. 5 toward the left side position against the spring load to enter into a pressure regulating operation in which the third port $P_3$ is opened as the fifth port $P_5$ is gradually closed. Therefore, in the case of the oil passage connection in which the third port $P_3$ is set to a hydraulic pressure supply side with the fourth port $P_4$ set to a hydraulic pressure discharge side just as in the previously-described circuit structure, a regulating oil pressure is output from the fourth port $P_4$. Conversely, in the case of the oil passage connection in which the fourth port $P_4$ is set to a hydraulic pressure supply side with the third port $P_3$ set on a hydraulic pressure discharge side, as in a circuit structure which will be described later, the oil pressure on the side of the fourth port $P_4$ is discharged as the oil pressure is regulated. During such a pressure regulating operation, the oil pressure (lockup on pressure) supplied to the hydraulic lockup chamber $R_L$ is applied to the first port $P_1$ irrespective of the connection mode, while the oil pressure (lockup off pressure) supplied to the converter chamber $R_C$ is applied to the sixth port $P_6$.

The lockup relay valve 4 is provided with a spool 41 having five lands 41a–41e of the same diameter, and a plunger 43 opposed to the spool 41 via a spring 42. The land 41a is formed as a member for receiving a lockup signal pressure from a first port $Q_1$, the land 41b serves as a switch valve for the second and third ports $Q_2$, $Q_3$ and for the third and fourth ports $Q_3$, $Q_4$; the land 41c serves as a switch valve for the fourth and fifth ports $Q_4$, $Q_5$ and for the fifth and sixth ports $Q_5$, $Q_6$; the land 41d serves as a switch valve for the sixth and seventh ports $Q_6$, $Q_7$ and for the seventh and eighth ports $Q_7$, $Q_8$; and the land 41e serves as both a switch valve and a member for receiving a signal pressure from eighth and ninth ports $Q_8$, $Q_9$. In this oil passage communication setting operation, the second port $Q_2$ is connected to a lubricating pressure supply oil passage, the third port $Q_3$ to an oil passage of a cooler, the fourth port $Q_4$ to the discharge oil passage $L_R$ extending from the converter oil passage $R_C$, the fifth port $Q_5$ to the drain, the sixth port $Q_6$ to a supply oil passage joined to the converter chamber $R_C$ via a check ball, the seventh port $Q_7$ to the source pressure oil passage $L_S$ for a secondary pressure, and the eighth port $Q_8$ to an oil supply passage joined directly to the converter chamber $R_C$, the ninth port $Q_9$ being closed at its opening with a separator plate.

At the lockup off time, the lockup relay valve 4, formed as described, takes a spool position as shown in the left side portion of FIG. 5 so that discharge oil from the converter chamber $R_C$ flows to the cooler owing to the communication between third and fourth ports $Q_3$, $Q_4$ with the oil pressure in the secondary pressure oil passage $L_S$ supplied to the converter chamber $R_C$ due to the communication of the seventh and eighth ports $Q_7$, $Q_8$. When a lockup on signal pressure is applied to the first port $Q_1$, the spool 41 is shifted to the right side of FIG. 5 to be put in the condition in which discharge oil from the converter chamber $R_C$ is drained directly as a result of the communication between the fourth and fifth ports $Q_4$, $Q_5$ with an oil pressure in the secondary pressure oil passage $L_S$ supplied to the converter chamber $R_C$ through an oil passage provided via a check ball due to the communication between the sixth and seventh ports $Q_6$, $Q_7$.

In this independent hydraulic lockup chamber setting operation, with respect to the oil passage setting of the lockup control value 2, the opening of the secondary pressure oil passage and that of the drain oil passage of the first-mentioned member $B_1$ of the valve body are all provided so as to overlap the openings of the oil passages $L_3$, $L_5$ communicating with the third and fifth ports $P_3$, $P_5$ of the second-mentioned member $B_2$ of the valve body, and, owing to the communication ports of the separator plate $B_S$ inserted between the two members $B_1$, $B_2$ of the valve body, the opening of the oil passage $L_3$ communicates with that of the secondary pressure oil passage $L_S$, and the opening of the oil passage $L_5$ communicates with that of the drain oil passage $L_E$. Therefore, the third port $P_3$ communicates with the secondary pressure oil, and the fifth port $P_5$ with the drain.

Figure 6:
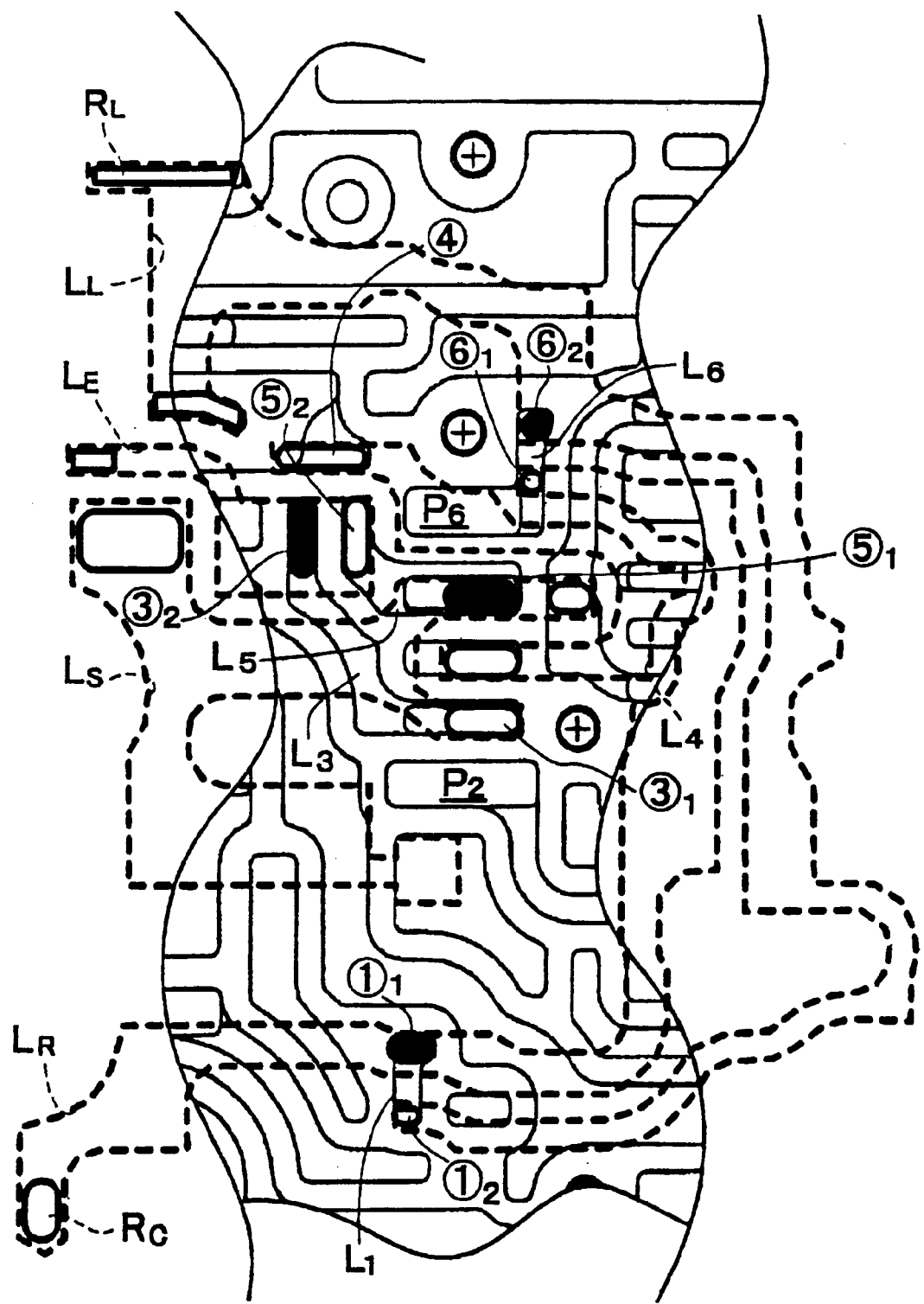
FIG. 6 is diagram showing the details of a laminated structure of the valve body in the first mode of embodiment.

FIG. 6 illustrates actual circuits of the two valve body members, and a separator plate inserted therebetween. In this example, oil passages shown by solid lines are oil passages in member $B_1$ of the valve body, and those shown by broken lines oil passages in the member $B_2$. The opening of the secondary pressure oil passage $L_S$ overlaps those of the oil passages $L_3$, $L_5$, which are joined to the openings of the third and fifth ports $P_3$, $P_5$ of the lockup control valve 2, in positions shown by $(3)_1$, $(5)_2$. The opening of the drain oil passage $L_E$ overlaps those of the oil passages $L_3$, $L_5$, which are joined to the third and fifth ports $P_3$, $P_5$, in positions $(3)_2$, $(5)_1$. In this case, the places shown filled with a black color are shut off by the separator plate $B_S$, and the places shown by contour lines only communicate with other oil passages via the communication ports in the separator plate $B_S$. The return oil passage $L_R$ overlaps the oil passage $L_1$ at a position $(1)_1$, and the oil passage $L_6$ at a position $(6)_1$. The oil passage $L_R$ is shut off by the separator plate $B_S$ at the position $(1)_1$, and communicates with the oil passage $L_6$ via a communication port in the separator plate $B_S$ at position $(6)_1$. The lockup oil passage $L_L$ overlaps the oil passage $L_1$ at a position $(1)_2$, and the oil passage $L_6$ in a position $(6)_2$. The oil passage $L_L$ is shut off at position $(6)_2$, and communicates with the oil passage $L_1$ via a communication port in the separator plate at position $(1)_2$. The drain oil passage $L_E$ overlaps the oil passage $L_3$ at the position $(3)_2$, and the oil passage $L_5$ at the position $(5)_2$. The oil passage $L_E$ is closed at the position $(3)_2$ and communicates with another oil passage at the position $(5)_2$.

The supply of a hydraulic pressure to and the control of the lockup clutch 11 for the torque converter 1 by the hydraulic control apparatus formed by such a circuit setting operation are done as follows. In the lockup off condition, the supply of a hydraulic pressure to the converter chamber $R_C$ is done from the oil passage $L_L$ via the lockup relay valve 4, which takes the left side position in FIG. 5, by a spring load because the application of a signal pressure from the lockup linear solenoid valve 3 is not carried out, and the return of the hydraulic pressure is done from the oil passage $L_R$ toward the cooler via the lockup relay valve 4.

In the lockup on condition, the lockup signal pressure outputted from the linear solenoid valve 3 is applied to the second port $P_2$ of the lockup control valve 2 and a spool end of the lockup relay valve 4. Consequently, the lockup control valve 2 starts a pressure regulating operation, and an output hydraulic pressure from the fourth port $P_4$ is supplied to the lockup oil chamber $R_L$ via the oil passage $L_L$. In this pressure regulating condition, the output hydraulic pressure is applied as a feed back pressure to the first port $P_1$ in the direction against the signal pressure, and to the sixth port $P_6$ in the direction in which the direction of a pressure supplied to the converter chamber $R_C$ agrees with that of the application of an output hydraulic pressure. The lockup relay valve 4 is shifted to the right side position in the FIG. 5, and the supply of the hydraulic pressure from the oil passage $L_C$ is done in the same manner with a level of the hydraulic pressure reduced to a level lower than that in the lockup off condition by the draining operation of the relief valve 8 based on the switching of the port. However, a return side portion communicates with the drain via the lockup relay valve 4, and is therefore drained so that the oil does not pass through the cooler. The switching of the flow passages is done in accordance with the reduction of the hydraulic transmission load by a lockup operation.

Figure 7:
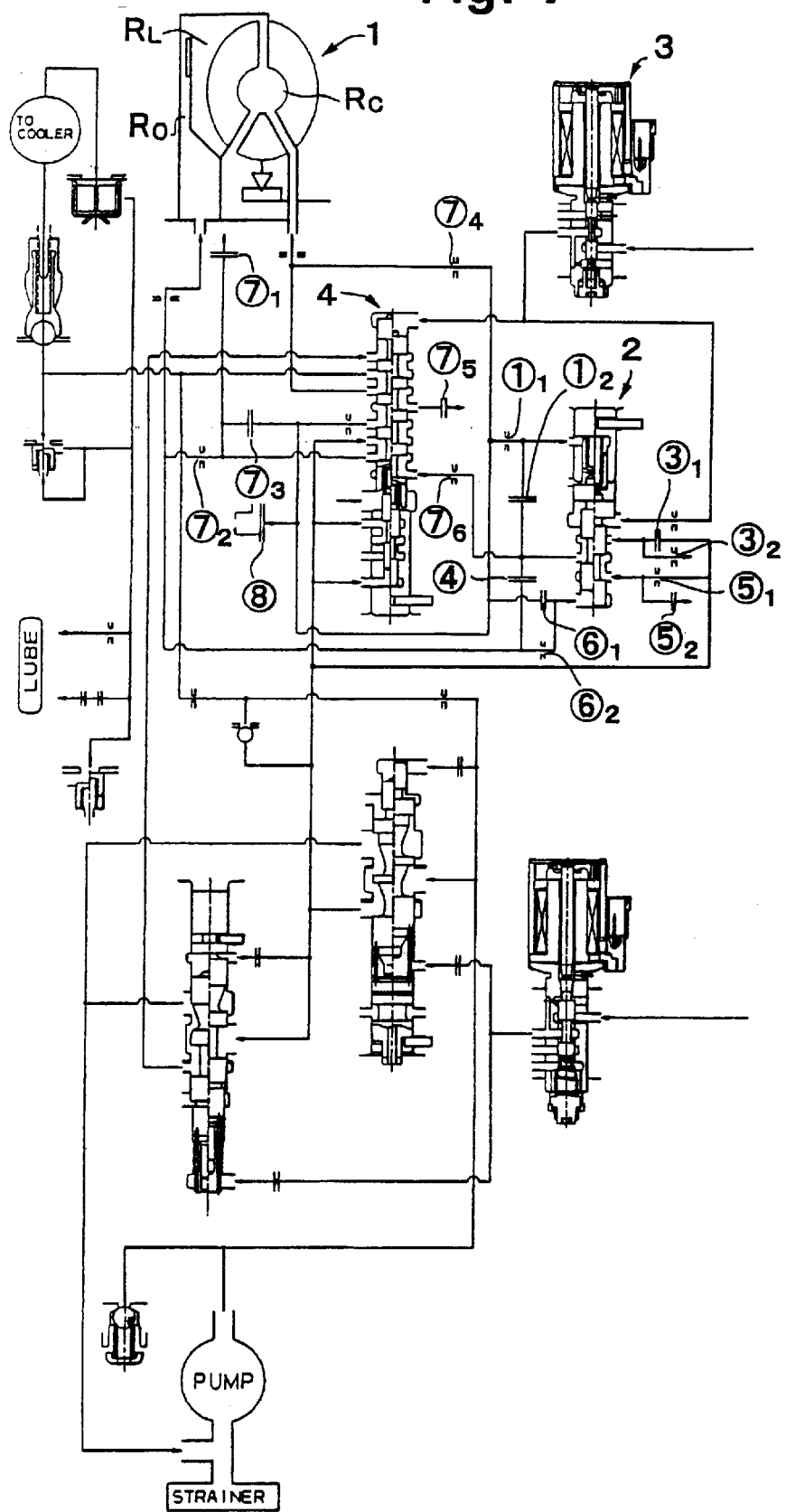
FIG. 7 is a hydraulic circuit diagram showing a case where the type of torque converter has been changed in the first mode of embodiment.
Figure 8:
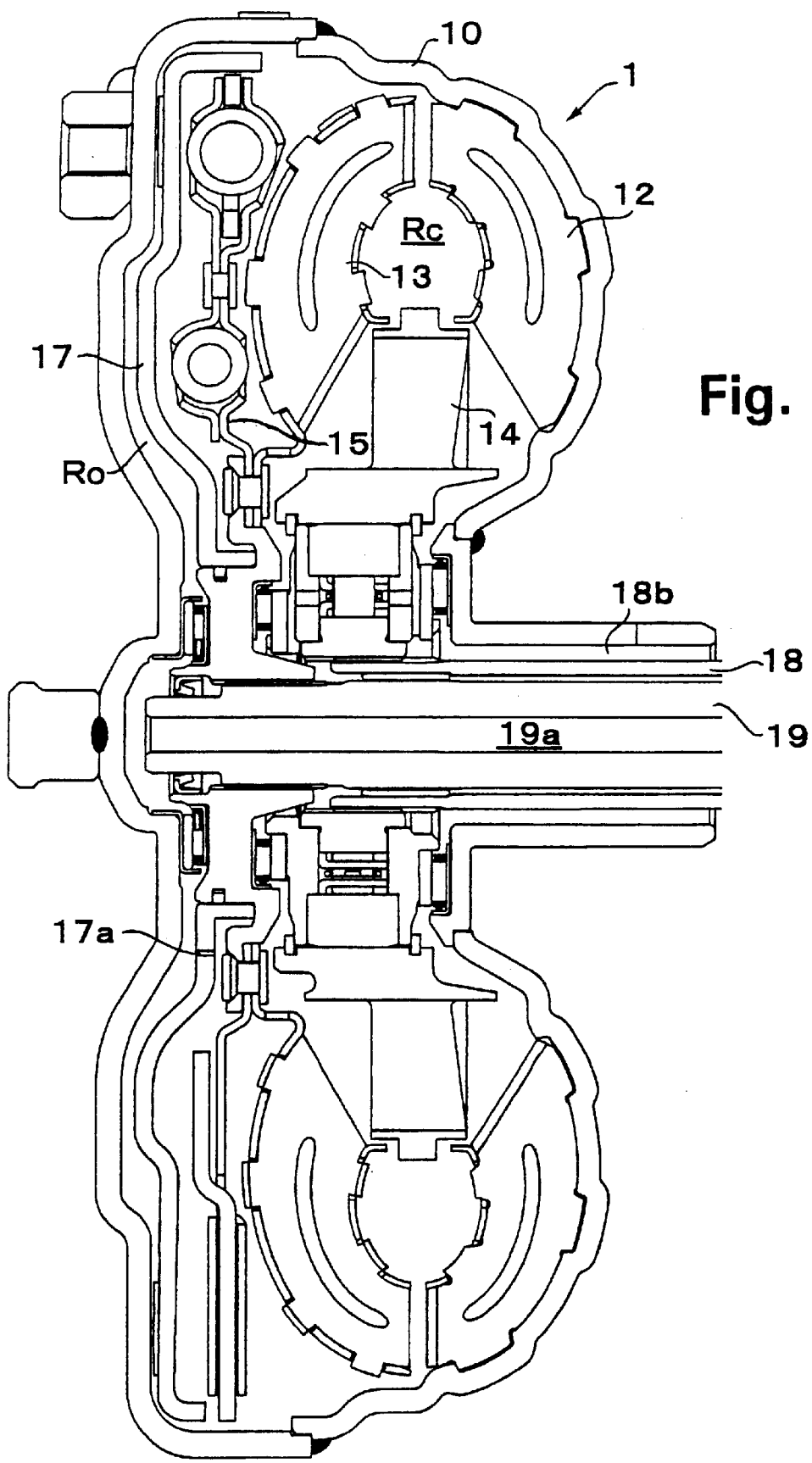
FIG. 8 is a sectional view of a torque converter of the type in which a hydraulic lockup chamber is opened.

FIG. 7, shows by a circuit diagram, the setting of oil passages in a case where a hydraulic lockup chamber-opened type torque converter, which has a different type of lockup clutch, shown in detail in FIG. 8, used with the arrangement of oil passages in a valve body that is identical to that in the previously-described example. As is clear from a comparison between FIGS. 1 and 7, the difference between the two circuits resides only in the setting of the communication and shut-off relationships between oil passages. In the case of FIG. 7, the communication of $(3)_1$ is switched to that of $(3)_2$, the communication of $(5)_2$ to that of $(5)_1$, the communication of $(1)_2$ to that of $(1)_1$, and the communication of $(6)_1$ to that of $(6)_2$, respectively, in the circuit. The switching operation is carried out by replacing the separator plate $B_S$, as shown in FIG. 2, with a separator plate $B_S$ in which the positions of communication ports are different from those of the communication ports of the separator plate $B_S$ of FIG. 2. By replacing the separator plate $B_S$, the communication and shut-off relationship of a position (4) and those of additional numeral-carrying (7) are switched, and a position (8) is shut off in accordance with the removal of the relief valve 8. The communication and shut-off switching operation is carried out-in accordance with the presence or absence of the communication ports in the mentioned positions on the separator plate $B_S$, i.e., in accordance with the relationship established representatively between the oil passages $L_4$, $L_L$ shown in FIG. 3.

Figure 9:
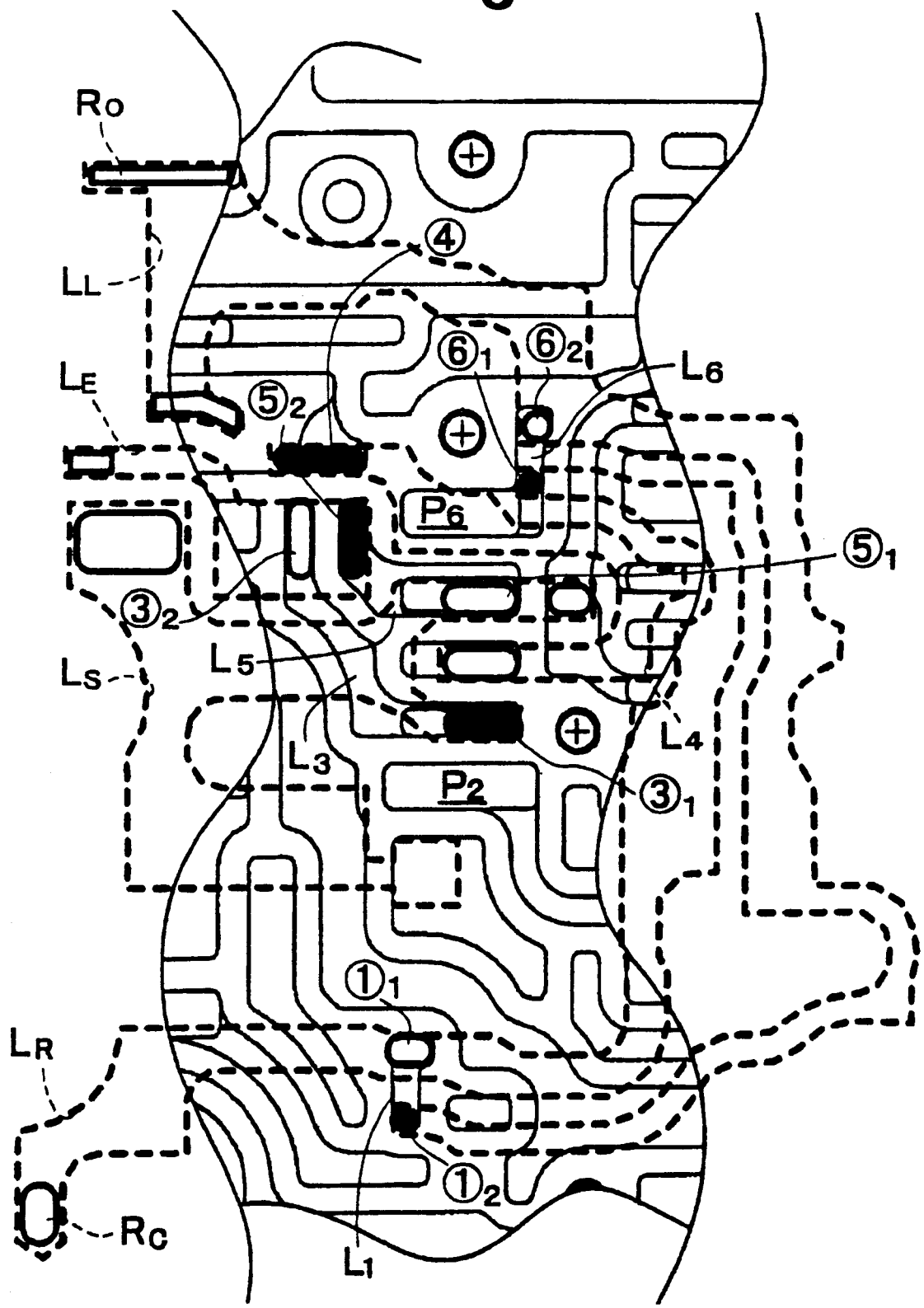
FIG. 9 is an arrangement diagram of oil passages showing the details of the laminated structure of a valve body with the relationship between the communicated condition and shut-off condition thereof just changed.

The relationship will be described using an actual circuit that corresponds to (substitutes for) that previously discussed with respect to that shown in FIG. 6. As shown in FIG. 9, the opening of a secondary pressure oil passage $L_S$ overlaps those of oil passages $L_3$, $L_5$ joined to third and fifth ports P3, P5 of the lockup control valve 2 in positions shown by $(3)_1$, $(5)_1$ and the opening of a drain oil passage $L_E$ to those of oil passages $L_3$, $L_5$ joined to the third and fifth ports $P_3$, $P_5$ in positions $(3)_2$, $(5)_2$. In this example, the openings shown blacked out are shut off by the separator plate, and those shown by contour lines only communicate with other oil passages via the communication ports of the separator plate $B_S$. The return oil passage $L_R$ overlaps the oil passage $L_1$ at a position $(1)_1$, and the oil passage $L_6$ in a position $(6)_1$. The return oil passage $L_R$ is closed with the separator plate $B_S$ at the position $(6)_1$, and communicates with other oil passages via the communication ports of the separator plate $B_S$. The hydraulic lockup passage $L_L$ overlaps the oil passage $L_1$ at the position $(1)_2$ and the oil passage $L_6$ at the position $(6)_2$. The hydraulic lockup passage $L_L$ is closed with the separator plate $B_S$ at the position $(1)_2$ and communicates with oil passage $L_6$ via the communication port of the separator plate $B_S$ at the position $(6)_2$. The drain oil passage $L_E$ overlaps the oil passage $L_3$ at the position $(3)_2$ and oil passage $L_5$ at the position $(5)_2$. The drain oil passage $L_E$ is closed in the position $(5)_2$ and communicates with the other passage $L_3$ at the position $(3)_2$.

Although the shapes of particular portions of the torque converter shown in cross section in FIG. 8 differ from those of the corresponding portions of the torque converter of FIG. 4, the practical structure of the former torque converter is substantially identical with that of the latter torque converter. Therefore, only the differences will be described. In the structure of FIG. 8, a piston 17 is supported to be axially slidable on an outer circumference of a hub of a turbine runner 13 and also serves as a clutch plate. Because an outer circumferential facing of the clutch plate piston 17 is pressed against a radial wall of a converter case 10, the rotation of the case 10 is transmitted to the clutch plate piston 17, and the rotation of the clutch plate piston 17 to the turbine hub via a damper plate 15, which meshes with an outer circumference of the clutch plate 17, and further to an input shaft 19 spline-engaged with the turbine hub. In this structure, a rear surface portion of the clutch plate 17 is opened in the converter chamber $R_C$.

Unlike a flow of a hydraulic pressure supplied to the converter chamber $R_C$ of the previously-described type of torque converter, the flow of the hydraulic pressure supplied to the converter chamber $R_C$ of the torque converter of FIG. 8 is reversed at the lockup on time and lockup off time. That is, at the lockup on time, the lockup control valve 2 does not supply a hydraulic pressure but functions as a valve for controlling the discharge of the hydraulic pressure. To be more exact, an oil passage of a lockup off chamber (opposite side of the converter chamber) $R_O$, of the circuit shown in FIG. 7, is formed so as to communicate with a fourth port $P_4$ (details are found in FIG. 5) of the lockup control valve 2 via a lockup relay valve 4 and extend in a drain-communicating condition from a third port $P_3$ of the lockup control valve 2 in a pressure regulated state to a drain oil passage. In this condition, the supplying of a hydraulic pressure to the converter chamber (lockup on side) $R_C$ is done from a secondary pressure oil passage $L_S$ and through the lockup relay valve 4 which takes a spool position at a right side in the drawing. The discharge of the hydraulic pressure from the converter chamber $R_C$ is done gradually via an orifice 17a formed in the clutch plate 17. The return oil is drained through the above-mentioned path extending via the lockup relay valve 4.

In order to change, according to this mode of the embodiment, a torque converter in which the lockup oil chamber $R_L$ is independent of the converter chamber $R_C$ to a torque converter in which the lockup oil chamber $R_L$ is opened in the converter chamber $R_C$, or in order to change the latter to the former, the relationship between the supply of a hydraulic pressure and the discharge thereof, done by an operation of the lockup control valve 2, is reversed with the hydraulic pressure output relationship based on maintaining a lockup on signal, by only replacing a separator plate $B_S$ inserted between the two members $B_1$, $B_2$ of a valve body, whereby the apparatus can be adapted to a change in the type of the lockup clutch of the torque converter 1. Therefore, according to the structure, the need to replace the valve body, which demands a change in the design of a metal mold therefor, when the arrangement of the oil passage is changed, can be eliminated.

Figure 10:
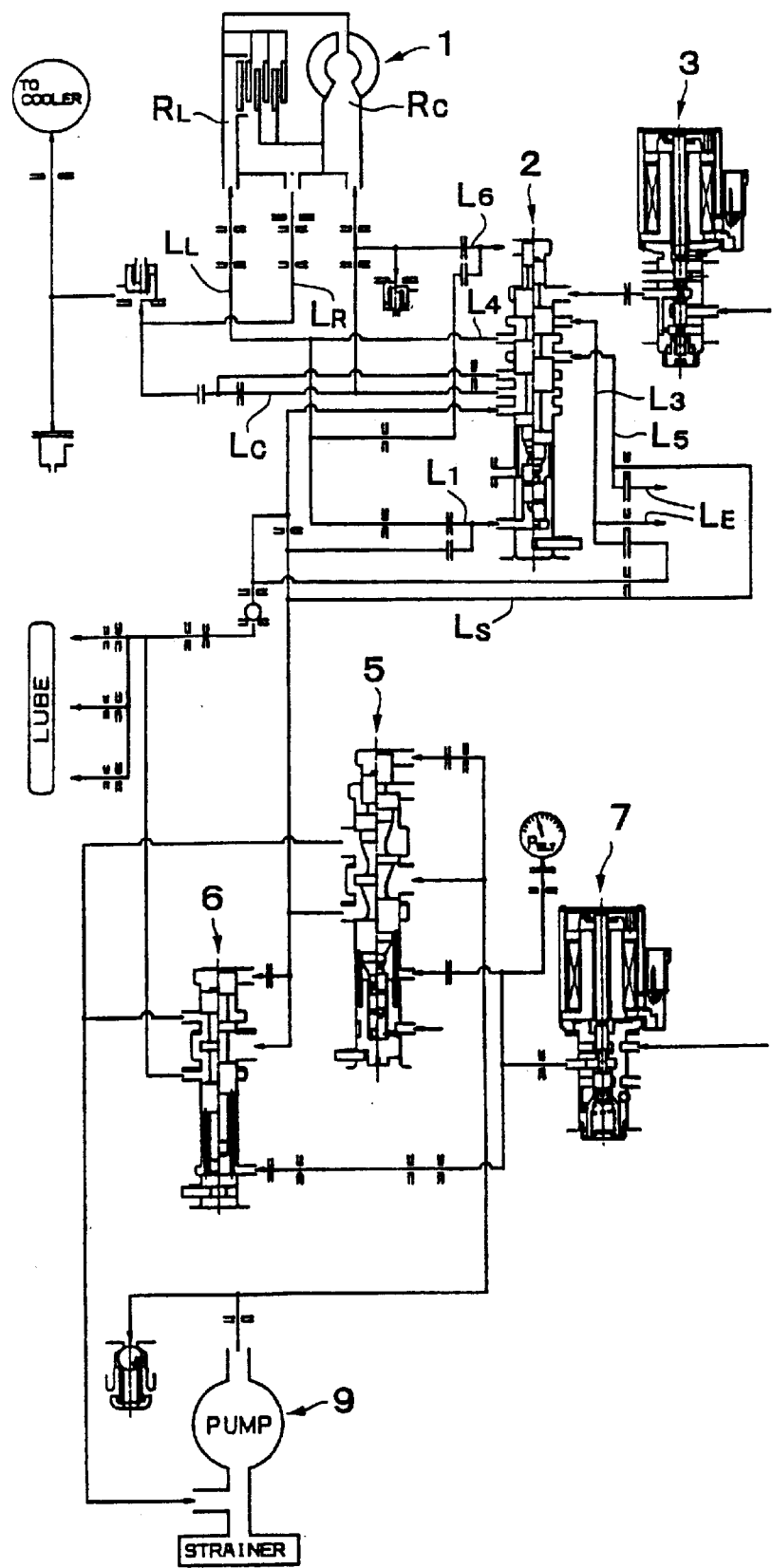
FIG. 10 is a hydraulic circuit diagram of a second mode of the embodiment with the type of a pressure regulating valve just changed.
Figure 11:
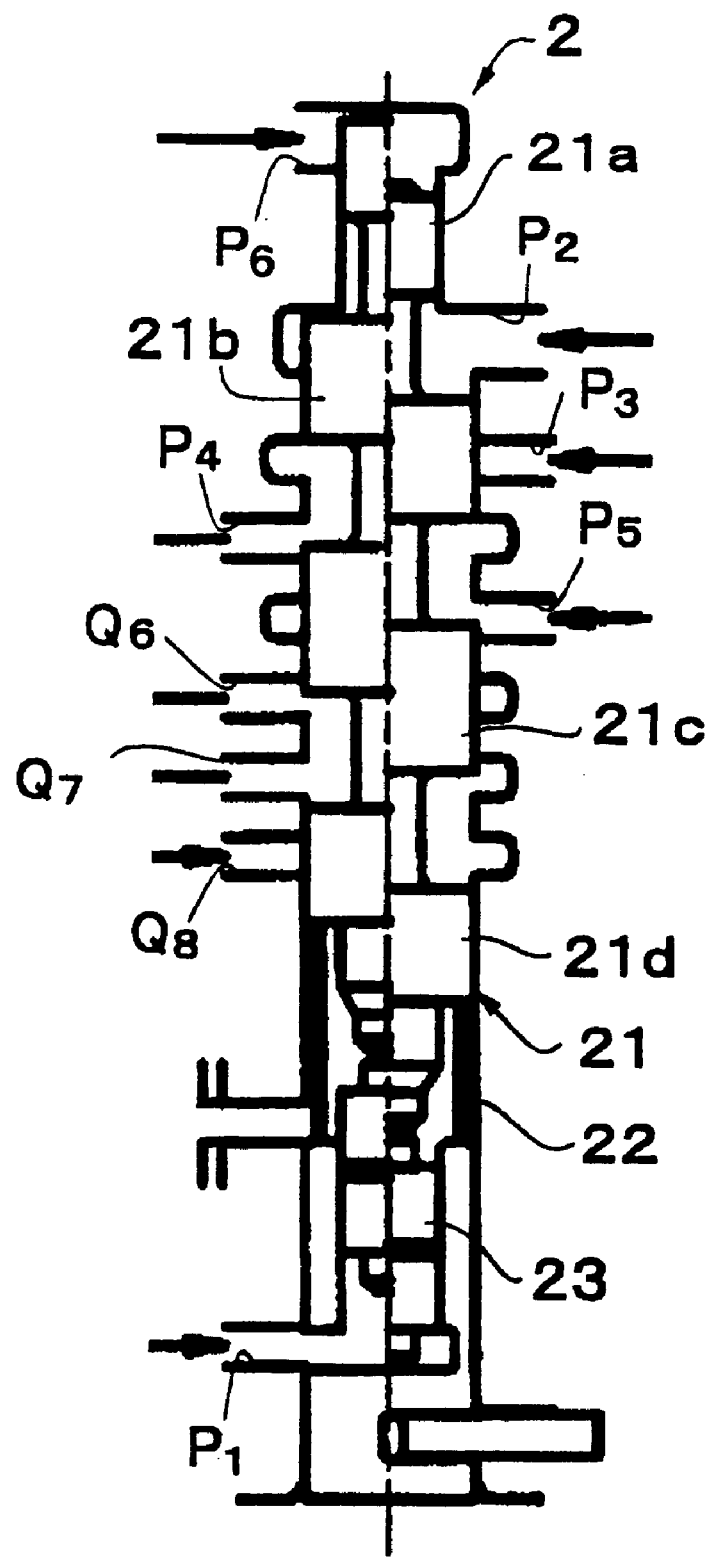
FIG. 11 is a partial circuit diagram showing the details of a pressure regulating valve made integral with a lockup relay valve in the second embodiment of the hydraulic control apparatus.
Figure 12:
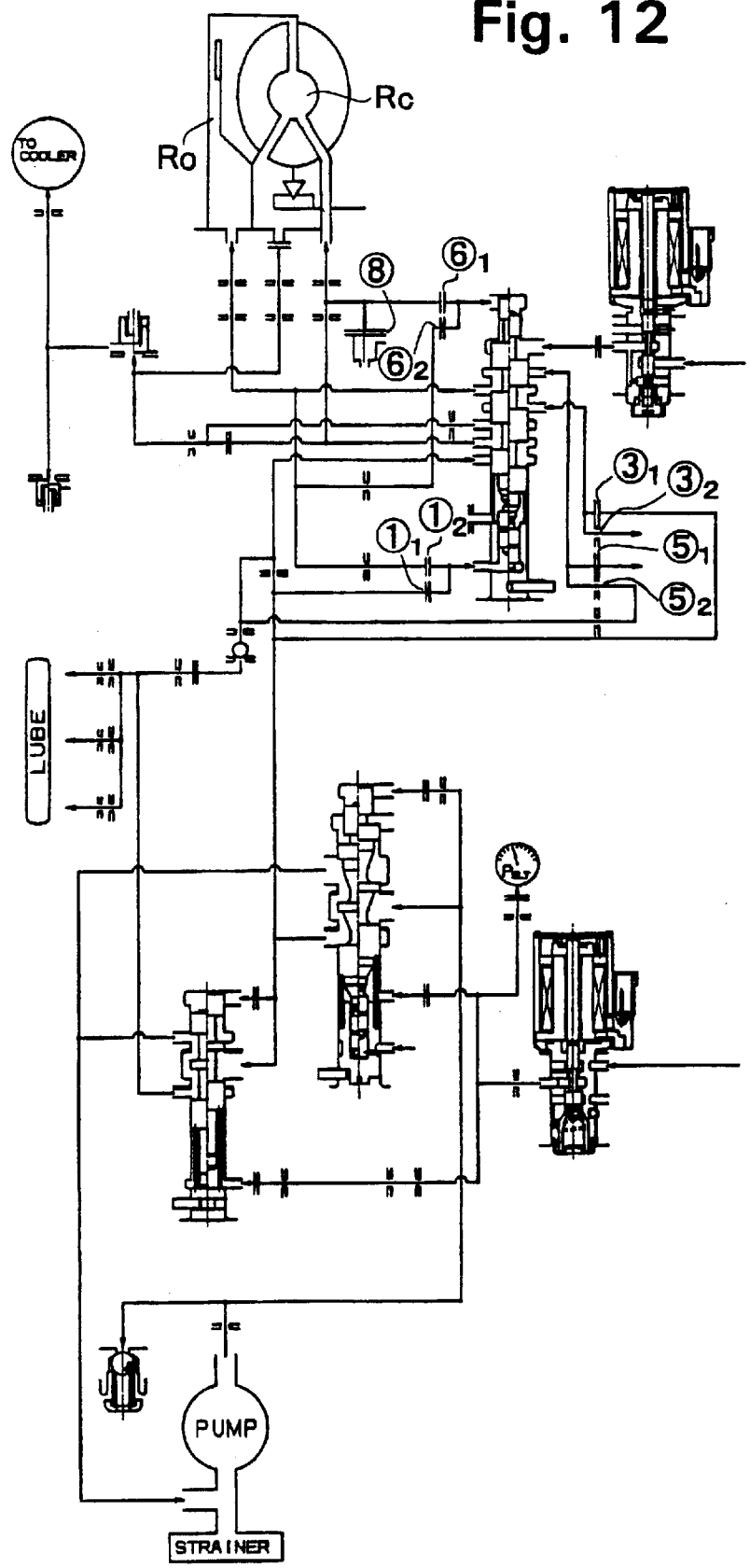
FIG. 12 is a hydraulic circuit diagram showing a case where the type of a lockup clutch has been changed in the second mode of embodiment.

FIGS. 10–12 show a second mode of the embodiment in which the type of a lockup control valve, as a pressure regulating valve, is changed with respect to the first mode of the embodiment. The characteristics of the second mode of the embodiment reside in the lockup control valve is made integral with a lockup relay valve. Unlike the first mode of the embodiment, the second mode of the embodiment has a valve body of a three-layer structure, so that the number of communicating portions for the oil passages increases. However, because this structure is not related to the subject matter of the invention, a description thereof will be omitted.

In this mode of the embodiment, a spool 21 of the lockup control valve 2 has four lands, as shown in detail in FIG. 11, which include a first small-diameter land 21a, and second to fourth lands 21b–21d of an equal diameter which is larger than the diameter of the first land 21a. The third and fourth lands 21c, 21d function as relay valves. A spring 22 for applying a load to the spool 21 in the valve-opening direction is supported on a plug inserted in the interior of a valve port, and engaged with an outer end of the land 21d of the spool 21, a plunger 23, inserted in a slide bore formed in the plug, is opposed to the outer end of the land 21d of the spool 21.

The lockup control valve 2 also has a second port $P_2$ to which a signal pressure from a linear solenoid valve 3 is applied, a fourth port $P_4$ that communicates with the hydraulic lockup chamber $R_L$, a third port $P_3$ on one side of the fourth port $P_4$, and a fifth port $P_5$ on the other side of the fourth port $P_4$. The lockup control valve 2 is further provided with a first and sixth ports $P_1$, $P_6$ to the outer sides of the second to fifth ports. The first port $P_1$ is provided on the side opposite to the sixth port $P_6$, that is, the side toward which the lockup control valve 2 is moved when a signal pressure is applied thereto from the linear solenoid valve 3.

The opening of the oil passage $L_3$ in communication with the third port $P_3$, and provided in one member $B_1$ of the valve body, is formed so as to overlap both the opening of a secondary pressure oil chamber $L_S$ provided in the other member $B_2$ of the valve body and that of the drain oil passage $L_E$. The opening of the oil passage $L_5$ in communication with the fifth port $P_5$ and provided in the first-mentioned member $B_1$ of the valve body is provided so as to overlap with both the opening of the secondary pressure oil passage $L_S$, formed in the second-mentioned member $B_2$ of the valve body, and that of the drain oil passage $L_E$. A separator plate $B_S$ having communication ports for changing the communication relationships among the oil passages in a suitable manner, is inserted between the two members $B_1$, $B_2$ of the valve body in the same manner as in the first mode of the embodiment.

Among the three ports $Q_6$–$Q_8$ constituting the lockup relay valve unit, a central port $Q_7$ is open all the time, and the port $Q_6$, on one side of the central port Q, is opened by and closed with land 21c. The port $Q_8$, on the other side of the central port $Q_7$, is opened by and closed with land 21d.

The port $Q_8$ communicates with the secondary pressure oil passage $L_S$, the port $Q_6$ with the hydraulic transmission chamber $R_C$ of a fluid joint, and the port $Q_7$ with the port $Q_6$ via an orifice.

In the case of the second mode of the embodiment, at the lockup off time, at which a signal pressure is not applied from the lockup linear solenoid valve 3, the supply of hydraulic pressure to the hydraulic transmission chamber $R_C$ is done from the oil passage $L_C$ and via the lockup control valve 2 which takes the position shown in the left side portion of the FIG. 11 due to the spring load and the return of the hydraulic pressure is done via the oil passage $L_R$ to a cooler. During this time, the hydraulic lockup passage $L_L$ communicates directly with an oil passage $L_4$ and an oil passage $L_3$, communicating with the oil passage $L_4$ via the lockup control valve, communicates with the drain.

At the lockup on time, a lockup signal pressure outputted from the linear solenoid valve 3 is applied to the second port $P_2$ of the lockup control valve 2. Consequently, the lockup control valve 2 starts a pressure regulating operation, and an output hydraulic pressure from the fourth port $P_4$ is supplied to the lockup oil chamber $R_L$ via the oilpassages $L_4$, $L_L$ and an oil passage in an input shaft. In this pressure regulating condition, the output hydraulic pressure is applied as a feedback pressure to the first port $P_1$ in the direction opposed to that of the signal pressure, and a supply pressure for the hydraulic transmission chamber $R_C$ is applied in the direction identical with that of the application of the output hydraulic pressure, whereby the relationship between the oil pressure in the hydraulic lockup chamber $R_L$ and that in the hydraulic transmission chamber $R_C$ are suitably maintained. At the return side, the hydraulic pressure flows from the oil passage $L_R$ via the cooler.

In the second mode of embodiment, the same effect, as in the above-described first mode of the embodiment, can be obtained by replacing the separator plate $B_S$ and thereby the apparatus is changed in type of lockup clutch. That is, in the circuit shown in FIG. 12, the communication of $(3)_1$ is switched to that of $(3)_2$, the communication of $(5)_1$ to that of $(5)_2$, the communication of $(1)_2$ to that of $(1)_1$, and the communication of $(6)_1$ to that of $(6)_2$, respectively. Due to the replacement of the separator plate $B_S$, the relief valve 8 is removed with a portion (8) closed. Especially, in this second mode of the embodiment, the effect of making the valve body compact is obtained due to the integral formation of the lockup control valve and relay valve.

Regarding the operation of the circuit carried out after the change in the type of lockup clutch, when the type of the lockup clutch is changed, the direction of flow of the hydraulic pressure supplied to the converter chamber $R_C$ reverses at the lockup on time and lockup off time. Accordingly, at the lockup on time, the lockup control valve 2 (FIG. 11 for details. Note that land 21d of FIG. 11 and 12 is longer than land 21d of FIG. 10.) does not supply a hydraulic pressure but rather functions as a valve for controlling the discharge of the hydraulic pressure. To be more exact, in the circuit shown in FIG. 12, an oil passage of a lockup off chamber $R_O$ (on the opposite side of the converter chamber) communicates, through the fourth port $P_4$ and the fifth port $P_5$ of the lockup control valve 2 in a pressure regulating state, with the drain oil passage. In this state, the supply of the hydraulic pressure to the converter chamber (lockup on side) $R_C$ is done from the secondary oil passage $L_S$ (FIG. 10 for detail) and through a relay valve portion of the lockup control valve 2 which takes a right side spool position in FIGS. 11 and 12. The discharging of a hydraulic pressure from the converter chamber $R_C$ is done gradually via an orifice formed in the clutch plate. The return oil is drained in the above-mentioned path extending through the lockup control valve 2. At the lockup on time, the port $P_6$ of the lockup control valve 2 communicates with the drain, while a secondary pressure is applied to the port $P_1$ against the lockup signal pressure. Therefore, the oil pressure in the converter chamber $R_C$ becomes low as compared with that at the lockup off time, and the oil pressure load on the converter case decreases.

Although the invention has been described on the basis of two modes of an embodiment for the convenience of making the technical concept of the invention understood, the invention is not limited to the illustrated embodiments. The invention can be practiced by modifying the structure thereof in various ways within the scope of what is defined in each claim.

What is claimed is:

1. A hydraulic control apparatus for automatic transmissions provided with a hydraulic transmission unit in which a hydraulic lockup chamber of a lockup clutch is independent of a hydraulic transmission chamber, comprising:
   a valve body formed by laminating at least two members on each other and having:

a pressure regulating valve adapted to regulate a hydraulic pressure supplied to the lockup clutch;

a control unit adapted to supply a signal pressure to the pressure regulating valve;

a source pressure oil passage adapted to supply a basic pressure for hydraulic pressure regulation; and a drain oil passage communicating with a drain port; and a separator plate inserted between the two members of the valve body; the pressure regulating valve having:
  a first port to which the signal pressure is applied from the control unit;
  a third port in communication with the hydraulic lockup chamber;
  a second port provided on one side of the third port; and
  a fourth port provided on the other side of the third port; an opening of an oil passage in communication with the second port and provided in one member of the valve body being formed so as to overlap both an opening of the source pressure oil passage and that of the drain oil passage which are provided in the other member of the valve body, an opening of an oil passage in communication with a fourth port and provided in said one member of the valve body being formed so as to overlap both an opening of the source pressure oil passage and that of the drain oil passage which are provided in said other member of the valve body; and
  wherein the separator plate is provided with communication ports for communicating the opening of the oil passage in communication with the second port and that of the source pressure oil passage with each other, and the opening of the oil passage in communication with the fourth port and that of the drain oil passage with each other.

2. A hydraulic control apparatus for automatic transmissions provided with a hydraulic transmission unit in which a hydraulic lockup chamber of a lockup clutch is opened in a hydraulic transmission chamber, comprising:

a valve body formed by laminating at least two members on each other and having:
  a pressure regulating valve adapted to regulate a hydraulic pressure supplied to the lockup clutch;
  a control unit adapted to supply a signal pressure to the pressure regulating valve;
  a source pressure oil passage adapted to supply a basic pressure for hydraulic pressure regulation; and
  a drain oil passage communicating with a drain port; and
  a separator plate inserted between the two members of the valve body; the pressure regulating valve having:
    a first port to which the signal pressure is applied from the control unit;
    a third port in communication with the hydraulic lockup chamber;
    a second port provided on one side of the third port; and
    a fourth port provided on the other side of the third port; an opening of an oil passage in communication with the second port and provided in one member of the valve body being formed so as to overlap both an opening of the source pressure oil passage and that of the drain oil passage which are provided in the other member of the valve body, an opening of an oil passage in communication with a fourth port and provided in said one member of the valve body being formed so as to overlap both an opening of the source pressure oil passage and that of the drain oil passage which are provided in said other member of the valve body; and
    wherein the separator plate is provided with communication ports for communicating the opening of the oil passage in communication with the second port and that of the drain oil passage with each other, and the opening of the oil passage in communication with the fourth port and that of the source pressure oil passage with each other.

3. The hydraulic control apparatus for automatic transmissions according to claim 1, wherein:
  the pressure regulating valve further has fifth and sixth ports, the fifth port being provided on the opposite end of the sixth port to which side the regulating valve is moved when the signal pressure is applied from the control unit,
  an opening of a transmission chamber oil passage which communicates with the hydraulic transmission chamber and that of a hydraulic lockup passage which communicates with the hydraulic lockup chamber being provided in said other member of the valve body,
  an opening of an oil passage in communication with the fifth port and that of an oil passage in communication with the sixth port each being provided so as to overlap both an opening of a hydraulic transmission passage and that of a hydraulic lockup passage,
  the separator plate having communication ports which communicate the oil passage in communication with the fifth port and the hydraulic lockup passage with each other, and the oil passage in communication with the sixth port and the transmission chamber oil passage with each other, respectively.

4. The hydraulic control apparatus for automatic transmissions according to claim 2, wherein:
  the pressure regulating valve further has fifth and sixth ports, the fifth port being provided on the opposite side of the sixth port to which side the regulating valve is moved when the signal pressure is applied from the control unit,
  an a opening of a hydraulic transmission passage in communication with the hydraulic transmission chamber and an opening of an hydraulic lockup passage in communication with the hydraulic lockup chamber being provided in said other member of the valve body,
  an opening of an oil passage in communication with the fifth port and provided in said one member of the valve body being provided so as to overlap both the opening of the hydraulic transmission passage provided in said other member of the valve body and that of the hydraulic lockup passage,
  an opening of the oil passage in communication with the sixth port and provided in said one member of the valve body being provided so as to overlap both the opening of the hydraulic transmission passage provided in said other member of the valve body and that of the hydraulic lockup passage,
  the separator plate having communication ports which communicate the oil passage in communication with the fifth port and the hydraulic transmission passage with each other, and the oil passage in communication with the sixth port and the hydraulic lockup passage with each other respectively.

5. The hydraulic control apparatus for automatic transmissions according to claim 3, wherein the apparatus includes a relay valve having a port to which a signal pressure from the control unit is applied and a port that communicates with the hydraulic transmission chamber, the relay valve adapted to control a hydraulic pressure in the hydraulic transmission chamber in accordance with the signal pressure from the control unit.

6. The hydraulic control apparatus for automatic transmissions according to claim 4, wherein the apparatus includes a relay valve having a port to which a signal pressure from the control unit is applied and a port that communicates with the hydraulic transmission chamber, the relay valve adapted to control a hydraulic pressure in the hydraulic transmission chamber in accordance with the signal pressure from the control unit.

7. The hydraulic control apparatus for automatic transmissions according to claim 5, wherein the apparatus has the relay valve formed separately from the pressure regulating valve.

8. The hydraulic control apparatus for automatic transmissions according to claim 6, wherein the apparatus has the relay valve formed separately from the pressure regulating valve.

9. The hydraulic control apparatus for automatic transmissions according to claim 5, wherein the apparatus has the relay valve made integral with the pressure regulating valve.

10. The hydraulic control apparatus for automatic transmissions according to claim 6, wherein the apparatus has the relay valve made integral with the pressure regulating valve.

* * * * *